(12) United States Patent
Gilula

(10) Patent No.: US 11,170,062 B2
(45) Date of Patent: Nov. 9, 2021

(54) STRUCTURED SEARCH VIA KEY-OBJECTS

(71) Applicant: KeyArk, Inc., Foster City, CA (US)

(72) Inventor: Mikhail Gilula, Foster City, CA (US)

(73) Assignee: KeyArk, Inc., Foster City, CA (US)

( * ) Notice: Subject to any disclaimer, the term of this patent is extended or adjusted under 35 U.S.C. 154(b) by 303 days.

(21) Appl. No.: 16/587,935

(22) Filed: Sep. 30, 2019

(65) Prior Publication Data

US 2020/0026741 A1 Jan. 23, 2020

Related U.S. Application Data

(63) Continuation of application No. 14/583,028, filed on Dec. 24, 2014, now abandoned.

(60) Provisional application No. 62/071,667, filed on Sep. 30, 2014.

(51) Int. Cl.
  *G06F 16/9535* (2019.01)
  *G06F 16/36* (2019.01)
  *G06F 16/955* (2019.01)

(52) U.S. Cl.
  CPC ........ *G06F 16/9535* (2019.01); *G06F 16/374* (2019.01); *G06F 16/9566* (2019.01)

(58) Field of Classification Search
  None
  See application file for complete search history.

(56) References Cited

U.S. PATENT DOCUMENTS

| | | |
|---|---|---|
| 8,312,039 B2 | 11/2012 | Gilula |
| 2002/0083039 A1 | 6/2002 | Ferrari et al. |
| 2004/0143644 A1 | 7/2004 | Berton et al. |
| 2011/0307504 A1 | 12/2011 | Agrawal et al. |
| 2014/0025702 A1 | 1/2014 | Curtiss et al. |
| 2015/0112961 A1 | 4/2015 | Jiang et al. |

*Primary Examiner* — James Trujillo
*Assistant Examiner* — Kurt A Mueller
(74) *Attorney, Agent, or Firm* — Fish & Richardson P.C.

(57) ABSTRACT

A method and a system for structured searches of information via key-objects are disclosed herein. Key-objects may be used to describe certain features or parameters of content within webpages in a structured fashion, may be linked or embedded into respective webpages, and may be subsequently collected and stored by search engines enabling the structured searches. A thesaurus of key-objects may be updated with new key-objects discovered by search engines. Methods described herein may be used for structured searches of merchandise or services in e-commerce or mobile e-commerce thereby facilitating the location and comparison of merchandise by product specifications in lieu of keywords needed to get to the product specifications. In all, the elimination of voluminous and largely irrelevant outputs is realized, whereby users receive precise, streamlined, or exceedingly relevant responses at will, and can control or manipulate the order of the structured search outputs according to their specific information needs.

20 Claims, 14 Drawing Sheets

```
BRAND string =[ MANUFACTURER ];
COPIER_B {...};
COPIER_C {...};
DUPLEX_PRINTING boolean;
FAX_MACHINE_B {...};
FAX_MACHINE_C {...};
LINK url;
MANUFACTURER string =[ BRAND ];
MAX_PRINT_RESOLUTION { MAX_PRINT_RESOLUTION_HORIZONTAL_DPI
                      ,MAX_PRINT_RESOLUTION_VERTICAL_DPI };
MAX_PRINT_RESOLUTION_HORIZONTAL_DPI numeric;
MAX_PRINT_RESOLUTION_VERTICAL_DPI numeric;
MAX_PRINT_SPEED_BLACK_PPM numeric
MAX_PRINT_SPEED_COLOR_PPM numeric;
MULTIFUNCTION_PERIPHERAL_B { BRAND
                            ,COPIER_B
                            ,FAX_MACHINE_B
                            ,LINK
                            ,MODEL
                            ,PICTURE
                            ,PRICE_USD
                            ,PRINTER_B
                            ,SCANNER_B };
MULTIFUNCTION_PERIPHERAL_C { BRAND
                            ,COPIER_C
                            ,FAX_MACHINE_C
                            ,LINK
                            ,MODEL
                            ,PICTURE
                            ,PRICE_USD
                            ,PRINTER_C
                            ,SCANNER_C };
PICTURE file_jpeg_link
PRICE_USD money;
PRINTER_B { DUPLEX_PRINTING
           ,LINK
           ,MANUFACTURER
           ,MAX_PRINT_RESOLUTION
           ,MAX_PRINT_SPEED_BLACK_PPM
           ,MODEL
           ,PICTURE
           ,PRICE_USD
           ,PRINTING_METHOD };
PRINTER_C { BRAND
           ,DUPLEX_PRINTING
           ,LINK
           ,MAX_PRINT_RESOLUTION
           ,MAX_PRINT_SPEED_BLACK_PPM
           ,MAX_PRINT_SPEED_COLOR_PPM
           ,MODEL
           ,PICTURE
           ,PRICE_USD
           ,PRINTING_METHOD };
PRINTING_METHOD string;
SCANNER_B {...};
SCANNER_C {...};
```

FIGURE 2

| | Metaobjects | | | |
|---|---|---|---|---|
| Name | Type or Structure | Standard Instances / Values | Alteration Allowed | Implicit Inclusion |
| ... | ... | ... | ... | ... |
| ADVERTISING_MOVIE_AVI | file_avi | no | n/a | yes |
| ADVERTISING_STRING | string | no | n/a | yes |
| OBJECT_SEMANTICS | string | object-specific | yes | no |
| OBJECT_VERSION | string | object-specific | no | yes |
| ... | ... | ... | ... | ... |

FIGURE 3

```
MULTIFUNCTION_PERIPHERAL_B
{ BRAND
 ,COPIER_B
 ,FAX_MACHINE_B
 ,LINK
 ,MODEL
 ,OBJECT_SEMANTICS = 'Multifunction Monochrome
Peripheral'
 ,PICTURE
 ,PRICE_USD
 ,PRINTER_B
 ,SCANNER_B };
 ...
PRINTER_B
{ DUPLEX_PRINTING
 ,LINK
 ,MANUFACTURER
 ,MAX_PRINT_RESOLUTION
 ,MAX_PRINT_SPEED_BLACK_PPM
 ,MODEL
 ,OBJECT_SEMANTICS = 'Monochrome Printer'
 ,PICTURE
 ,PRICE_USD
 ,PRINTING_METHOD };
PRINTER_C
{ BRAND
 ,DUPLEX_PRINTING
 ,LINK
 ,MAX_PRINT_RESOLUTION
 ,MAX_PRINT_SPEED_BLACK_PPM
 ,MAX_PRINT_SPEED_COLOR_PPM
 ,MODEL
 ,OBJECT_SEMANTICS = 'Color Printer'
 ,PICTURE
 ,PRICE_USD
 ,PRINTING_METHOD };
```

FIGURE 4

| Key-object | Printer_B |
|---|---|

Object Semantics Monochrome Printer
Object Version 007-20070707

Price USD (numeric)

From ▶          To ▶

Manufacturer (alphanumeric) ▶ 1e

Model (alphanumeric) ▶ (*may enter a part of it*)

Printing Method (checkbox)

Laser ■ √
Inkjet ☐

Other (alphanumeric) ▶ (*may enter a part of it*)

Duplex Printing (radio button)

Yes ○
　No ●

Max Print Speed Black, ppm (numeric) ▶ 14

Max Print Resolution, dpi (numeric) x (numeric)

▶ 600    x    ▶ 600

*Enhance Query?* (radio button)

Yes ●
No ○

*Advertisement Welcome?* (checkbox)

String ■ √
Movie ☐

FIGURE 5

```
SELECT Printer_B
FROM MyThesaurus
WHERE Contains(manufacturer, '*AnyCase('le')*')
    AND printing_method = 'AnyCase('laser')'
    AND max_print_resolution_horisontal_dpi >= 600
    AND max_print_resolution_vertical_dpi >= 600
    AND duplex_printing = 0
    AND max_print_speed_black_ppm >= 14
EXPAND;
```

FIGURE 6

```
/********** Query #1 **********/
SELECT  multifunction_peripheral_b a
FROM MyThesaurus
WHERE (Contains(a.brand, '*AnyCase('le')*')
 OR Contains(printer_b.manufacturer,'*AnyCase('le')*'))
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_ppm >= 14
;
             /********** Query #2 **********/
SELECT multifunction_peripheral_c a
FROM MyThesaurus
WHERE (Contains(a.brand,'*AnyCase('le')*')
       OR Contains(printer_c.brand,'*AnyCase('le')*'))
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_black_ppm >= 14
;
             /********** Query #3 **********/
SELECT  printer_b
FROM MyThesaurus
WHERE Contains(manufacturer,'*AnyCase('le')*')
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_ppm >= 14
;
             /********** Query #4 **********/
SELECT printer_c
FROM MyThesaurus
WHERE Contains(brand, '*AnyCase('le')*')
  AND printing_method = 'AnyCase('laser')'
  AND max_print_resolution_horisontal_dpi >= 600
  AND max_print_resolution_vertical_dpi >= 600
  AND duplex_printing = 0
  AND max_print_speed_black_ppm >= 14
;
```

FIGURE 7

| Key-object | Printer_B |
|---|---|
| Object Semantics | Monochrome Printer |//
| colspan BEST VALUE! | |
| Price USD | 199.99 |
| Manufacturer | Lexmark |
| Model | E240 Monochrome Laser Printer |
| Printing Method | Laser |
| Duplex Printing | No |
| Max Print Speed Black, ppm | 27 |
| Max Print Resolution, dpi | |
| Horizontal | 600 |
| Vertical | 600 |
| Link | http://www.SDS.com/L-E240/ |

FIGURE 8

| Key-object | Printer_C |
|---|---|

Object Semantics  Color Printer

WHY BUY BLACK AND WHITE?!

Price USD  699.99

Brand  Lexmark

Model  C510 Color Laser Printer

Printing Method  Laser

Duplex Printing  No

Max Print Speed Black, ppm  30

Max Print Speed Color, ppm  10

Max Print Resolution, dpi

Horizontal  2400

Vertical  2400

Link  http://www.SuperDuperShopper.com/Lexmark-28S0200-C510-LASER/

FIGURE 9

Monochrome Printer

BEST VALUE!

| | |
|---|---|
| Price USD | 199.99 |
| Manufacturer | Lexmark |
| Model | E240 Monochrome Laser Printer |
| Printing Method | Laser |
| Duplex Printing | No |
| Max Print Speed Black, ppm | 27 |
| Max Print Resolution, dpi HxV | 600x600 |

```html
<!DOCTYPE html>
<html>
<head>
<meta http-equiv=Content-Type content="text/html; charset=UTF-8" />
<meta name="keyobjects" content="filename.json" />
</head>
<body lang=EN-US>
<div class=WordSection1>
  <p><b><span style="font-family: Courier">Monochrome Printer</span></b></p>
  <p><span style="font-size: 16.0pt">BEST VALUE!</span></p>
  <table width="720" border="1" cellpadding="2" cellspacing="0">
    <tr>
      <th scope="row"><b><u><span style="font-family: "Arial", "sans-serif"">Price USD</span></u></b></th>
      <td><b><span style="font-family: Courier">199.99</span></b></td>
    </tr>
    <tr>
      <th scope="row"><b><u><span style="font-family: "Arial", "sans-serif"">Manufacturer</span></u></b></th>
      <td><b><span style="font-family: Courier">Lexmark</span></b></td>
    </tr>
    <tr>
      <th scope="row"><b><u><span style="font-family: "Arial", "sans-serif"">Model</span></u></b></th>
      <td><span class="MsoNormal"><b><span
          style='font-family: Courier'>E240 </span></b><b><span style='font-family: Courier'>Monochrome Laser
      Printer</span></b></span></td>
    </tr>
    <tr>
      <th scope="row"><b><u><span style="font-family: "Arial", "sans-serif"">Printing Method</span></u></b></th>
      <td><b><span style="font-family: Courier">Laser</span></b></td>
    </tr>
    <tr>
      <th scope="row"><b><u><span style="font-family: "Arial", "sans-serif"">Duplex Printing</span></u></b></th>
      <td><b><span style="font-family: Courier">No</span></b></td>
    </tr>
    <tr>
      <th scope="row"><b><u><span style="font-family: "Arial", "sans-serif"">Max Print Speed Black, ppm</span></u></b></th>
      <td><b><span style="font-family: Courier">27</span></b></td>
    </tr>
    <tr>
      <th scope="row"><span class="MsoNormal"><b><u><span style='font-family: "Arial", "sans-serif"'>Max
      Print Resolution, dpi</span></u></b><b><span style="font-family: "Arial", "sans-serif""> HxV</span><span
          style='font-family: "Arial", "sans-serif"'></span></b></span></th>
      <td>600x600</td>
    </tr>
    <tr>
      <th colspan="2" scope="row"><span style="text-align: center"><img width=258 height=221 src="pic.jpg"
          alt="Lexmark™ E240 Monochrome Laser Printer"></span></th>
    </tr>
  </table>
</div>

</body>
</html>
```

FIGURE 12

```
{"Printer_B":{
        "price_usd":"199.99",
        "manufacturer":"Lexmark",
        "model":"E240 Monochrome Laser Printer",
        "duplex_printing":"no",
        "link":"http://www.SDS.com/L-E240/",
        "max_print_resolution_dpi":{
        "horizontal":"600",
        "vertical":"600"
        },
        "max_print_speed_black":"27",
        "picture":" http://www.SDS.com/L-E240/pic.jpg/",
        "Printing Method":"Laser"
}}
```

FIGURE 13

STRUCTURED SEARCH VIA KEY-OBJECTS

CROSS REFERENCE TO RELATED PATENTS

This application is a continuation of and claims priority to U.S. patent application Ser. No. 14/583,028, filed Dec. 24, 2014, which claims priority under 35 U.S.C. 119(e) to provisional application 62/071,667 filed on Sep. 30, 2014, both of which are hereby incorporated by reference in their entirety into this application.

FIELD OF THE INVENTION

This disclosure relates to structured searches of information including, but not limited to, searches for goods or services in e-commerce and mobile e-commerce.

BACKGROUND

Currently, the prevalent way of locating information on the Internet or the Intranets is a keyword-based search, also known as an unstructured search. In this paradigm, the goal of the search is to locate all web pages relevant to the keywords provided by a user. Along with associated advantages, this method also has some drawbacks as follows:

Intrinsic search imprecision. By using only keywords, it is generally difficult to determine the real question existing in the mind of the query originator because the same keywords may be used to pose different questions. Also, when trying to narrow down the search by adding more keywords, there is a greater risk of not finding the relevant information.

Search results only for humans. Since the results of the unstructured search are typically the documents conveying information in a natural language, it is not easy to process the search results programmatically—or not involving the human recipient. Of course, the webpages are always somewhat structured and sometimes present structured information, but the structure is not known a priori and the difficulties of processing natural languages programmatically always remain.

No user control over output order. The output order of the search results is controlled by a search engine, and presents a valuable trade secret of the search engine vendors. Some e-commerce websites allow users to sort the search results via price of merchandise. However, since the results are produced using keywords, the users often need to look through most of the returned items anyway. For example, currently when an eBay user specifies a model of a digital camera to search for, and chooses the "Price: lowest first" option, the first couple of hundred items in the output are not the listings of the camera, but instead are the camera accessories because they tend to be cheaper. This type of output order is not beneficial to a user employing keyword searching.

Search engines are not green. Due to search imprecision using keywords, most information returned by search engines is never viewed or consumed by the users. This means excessive CPU, IO cycles, network traffic, and watts of energy are wasted in data centers.

One of the areas underserved by the unstructured search is e-commerce. For example, there is no general way to search for all digital cameras with optical zoom not less than 10, and with not less than 10 megapixels, and weighing not more than 10 oz., and so on. The basic problems of locating merchandise using the unstructured search are as follows:

Inability of finding merchandise directly by specifications rather than by keywords, like brand or model needed to retrieve product specifications. Research of complex items may take hours and still does not guarantee the best deal. It would be vastly more efficient to search by multiple item characteristics at once, instead of going back and forth through dozens or hundreds of descriptions in order to compare them by several parameters.

The search output rankings are generally unrelated to the qualities of the merchandise (i.e., specifications) or the deals offered. Since the search results tend to be voluminous, a high search rank is critical for merchants. The keyword search puts buyers at a disadvantage because they are only able to look through the first few pages of an output, and whereby a better deal may be on the next page that they did not get to.

To alleviate these problems, e-merchants use the following main techniques: improving product search rankings by implementing a variety of learning algorithms aimed at extracting more information from the natural language search inputs, in particular, via analyzing the shopping behavior of the users; and classifying the products into search categories to minimize search outputs.

However, these techniques bring difficulties of their own and do not avoid the aforementioned problems altogether. Particularly, the classifiers require individual processing of each item description to assign the item description to the classifier groupings that vary from store to store. If the groupings change, the items need to be reprocessed. The classifiers are fixed and work only via an equality predicate. For example, it is generally impossible to negate a feature—e.g., saying one needs a printer with no duplex mode—or to specify one of an infinite number of conditions, which are not a part of the classifier at hand.

As a result, millions and millions of hours are spent annually by customers trying to locate the right merchandise or services, and to research and compare them in order to receive the best deal. Another problem with unstructured searches is the time it takes to sort through the voluminous responses generated by a keyword search. Therefore, there is a need for improved structured searches that would save time, increase precision, and better locate goods, services, or other entities of interest.

SUMMARY

In accordance with the invention, voluminous and wasteful search outputs derived from keyword-type unstructured searches are resolved via structured searches employing key-objects and key-object instances, and semantically related key-objects and key-object instances derived from a dynamically synchronized thesaurus. In one aspect, key-object instances are linked or embedded into webpages of the World Wide Web or Intranets to describe certain features or parameters of content within webpages in a structured fashion. Subsequently, the key-object instances are identified, collected, and stored by search engines enabling the structured searches, and the thesaurus of key-objects may be updated with new key-objects discovered by search engines. Accordingly, methods described herein may be used for structured searches of merchandise or services in e-commerce or mobile e-commerce thereby facilitating the location and comparison of merchandise by product specifications in lieu of keywords needed to get to the product specifications. As such, the elimination of largely irrelevant outputs is realized because users receive precise, streamlined, or exceedingly relevant responses at will, and can control or manipulate the order of the structured search outputs according to their specific information needs. In all, the invention advantageously transforms conventional, voluminous, and wasteful unstructured search outputs into increasingly relevant or specific, precise, expedient, and succinctly comparable structured search outputs.

BRIEF DESCRIPTION OF THE DRAWINGS

For a detailed description of exemplary embodiments of the invention, reference is made to the accompanying drawings wherein:

FIG. 2 shows an exemplary fragment of a thesaurus in accordance with one embodiment of the invention;

FIG. 3 illustrates a table of exemplary meta-objects that may be included into key-objects in accordance with one embodiment of the invention;

FIG. 4 illustrates exemplary key-objects after inclusion of the standard meta-objects of FIG. 3 in accordance with one embodiment of the invention;

FIG. 5 illustrates a graphical user interface used to generate a query in accordance with one embodiment of the invention;

FIG. 6 shows the query of FIG. 5 reformulated using an exemplary structured query language in accordance with one embodiment of the invention;

FIG. 7 illustrates subqueries generated in response to the user input of FIG. 5 in accordance with one embodiment of the invention;

FIG. 8 illustrates an exemplary instance of a key-object produced in response to the query in FIG. 5 in accordance with one embodiment of the invention;

FIG. 9 depicts an exemplary instance of a key-object produced in response to the query in FIG. 5 in accordance with one embodiment of the invention;

FIG. 12 illustrates an exemplary HTML of a webpage as in FIG. 11 describing the instance of the key-object Printer_B of FIG. 8 having a meta-tag "keyobjects" with a link to a JSON file "filename.json" containing the key-object instance.

FIG. 13 shows the contents of the file "filename.json" linked to the webpage of FIGS. 11 and 12 and containing the key-object instance of FIG. 8.

DETAILED DESCRIPTION

Particular embodiments of the invention are described herein to provide a sufficient understanding of how to make and use the invention. Those skilled in the art, however, will appreciate that some elements of the invention are commonplace and do not require specific details for their operation in a general sense (e.g., a processor, a memory, a computer system, and the like). Alternatively stated, certain embodiments are presented as block diagram or flowcharts to communicate the essence of the invention without limiting the invention or obscuring the inventive concept. Further, in certain embodiments, all functions described herein may be performed in either hardware or software, or a combination thereof (i.e., computer system) unless indicated otherwise.

The following description is also directed to various embodiments of the invention. Although one or more of these embodiments may be preferred, none of the embodiments should be interpreted or otherwise as limiting the scope of the invention. Further, one skilled in the art will appreciate the invention is capable of broad application and should not be limited to the description of any one embodiment or application herein.

The essence of the invention described herein is that the process of searching for a best deal for merchandise or services, etc., consists not in searching via keywords and then going back and forth comparing the search output parameters in order to compile a shortlist of goods and services, then looking for the best deal, but is in: linking or embedding one or more instances of key-objects (i.e., key-object instances) into webpages; identifying the key-object instances in the webpages, retrieving and collecting the key-object instances from the webpages, and storing them in databases; conducting a structured search using pertinent key-objects against the databases of key-object instances and thus locating a shortlist much faster than via a keyword search; and looking for the best deal via researching merely a shortlist, or just by following the links already provided as the results of the structured search itself.

Figure 1:
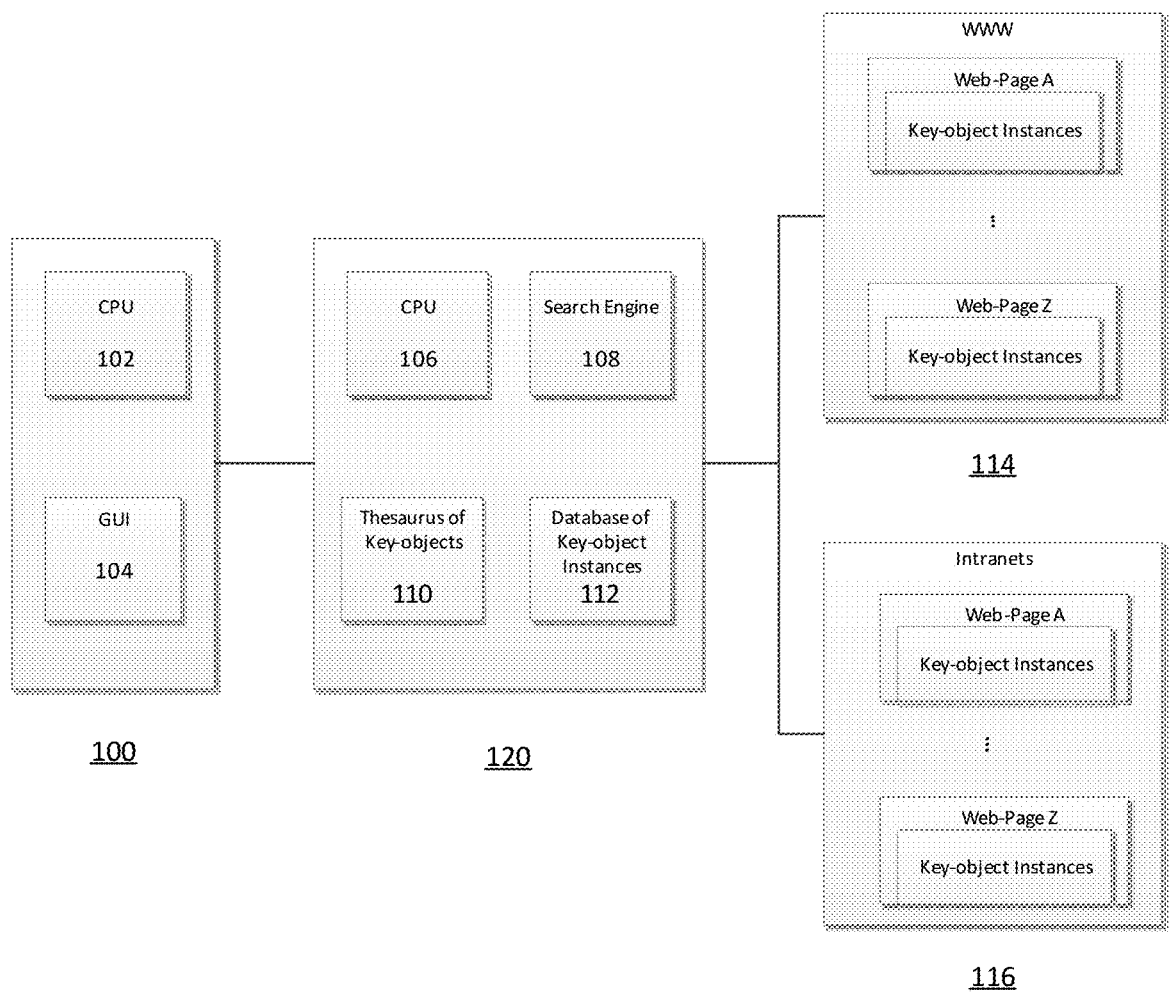
FIG. 1 shows one embodiment of a system used to perform structured searches.

FIG. 1 shows one embodiment of a computer, a computer system, a mobile or stationary communication device, a smartphone, a user module, or the like, 100. 100 includes a CPU 102 and a graphical user interface (GUI) 104. Processor 102 may be used for executing or computing a set or sets of instructions in the form of software. A computer, computer system, or server 120 is equipped with a CPU 106, a search engine 108, a thesaurus of key-objects 110, and a database 112 of key-object instances or structured data that can be specially built and maintained in order to provide search engine 108 with the ability to conduct structured searches in accordance with using pertinent key-objects, and locating a shortlist of goods and services much faster and more specific than via a keyword search. CPU 106 may also be used for executing or computing a set or sets of instructions in the form of software. Database 112 may also be used to store other data or signals. Database 112 may also be a localized database, a networked database accessed via a local area network (LAN), or a remote database accessed via a wide-area network (WAN). The database 112 may include key-object instances or data structures that are pulled from resources across the World Wide Web (WWW) 114 that includes Webpages A through Z populated with key-object instances; or the Intranets 116 that also includes Webpages A through Z populated with key-object instances, as in FIG. 1.

FIG. 2 shows an exemplary fragment of a collection, catalog, or thesaurus 110 in accordance with certain embodiments of the invention. The term "thesaurus," and variations thereof, used herein refers to a set of key-objects and relationships between key-objects (e.g., semantically, synonymously, or antonomously, without limitation). A key-object includes a set of specifications defining a target key-object instance. The set of specifications are data structures representing varying data points, data sets, or data configurations, which all describe the target key-object instance. A certain target key-object instance may be defined by various configurations of a set of specifications, with a lower bound of some minimum data structure needed in order to represent the target key-object instance specification, and an upper bound data structure representing the complete target key-object instance specification. Therefore, a subset of variant key-objects may define a target key-object instance. Furthermore, thesaurus 110 having a number of key-objects and synonyms or antonyms thereof facilitates or augments defining said target key-object instances by a subset of variant key-objects.

The exemplary thesaurus 110 fragment of FIG. 2 includes the following atomic key-objects with their associated types: Brand (string), Duplex_printing (boolean), Link (URL—Uniform Resource Locator), Manufacturer (string), Max_ print_resolution_horizontal_dpi (numeric), Max_print_resolution_vertical_dpi (numeric), Max_print_speed_black_ppm (numeric), Max_print_speed_color_ppm (numeric), Picture_jpeg (file_jpeg), Price_USD (money), and Printing_method (string). The key-objects Brand and Manufacturer are defined as synonyms, or key-objects that are semantically equivalent. The relationship of synonymy is shown by setting Brand equal to Manufacturer and Manufacturer equal to Brand in the exemplary thesaurus 110 of FIG. 1 or FIG. 2. Although not explicitly shown, any other type of relationship may be formed between the key-objects, such as the relation of antonymy, as desired.

The exemplary thesaurus 110 of FIG. 1 or FIG. 2 includes the following non-atomic key-objects: Copier_B, Copier_C, Fax_machine_B, Fax_machine_C, Max_print_resolution, Multifunction_peripheral_B, Multifunction_peripheral_C, Printer_B, Printer_C, Scanner_B, and Scanner_C. The key-object Max_print_resolution includes the atomic key-objects Max_print_resolution_horizontal_dpi and Max_print_esolution_vertical_dpi. The key-object Multifunction_peripheral_B includes the atomic key-objects Brand, Link, Model, Picture_jpeg, and Price_USD, and also the non-atomic key-objects Copier_B, Fax_machine_B, Printer_B, and Scanner_B. The key-object Multifunction_peripheral_C includes the atomic key-objects Brand, Link, Model, Picture_jpeg, and Price_USD, and also the non-atomic key-objects Copier_C, Fax_machine_C, Printer_C, and Scanner_C. The key-object Printer_B includes the atomic key-objects Duplex_printing, Link, Manufacturer, Max_print_speed_black_ppm, Model, Picture_jpeg, Price_USD, Printing_method, and also the non-atomic key-object Max_print_resolution. The key-object Printer_C includes the atomic key-objects Brand, Duplex_printing, Link, Model, Picture_jpeg, Max_print_speed_black_ppm, Max_print_speed_color_ppm, Price_USD, Printing_method, and also the non-atomic key-object Max_print_resolution. Although not explicitly shown, the key-objects Copier_B, Copier_C, Fax_machine_B, Fax_machine_C, Scanner_B, and Scanner_C include other key-objects.

As can be appreciated, the exemplary thesaurus 110 of FIG. 1 or FIG. 2 could be used in the printing industry with data sources belonging to parties in the printing industry's value chain, such as manufacturers, suppliers, and distributors. Because the key-objects are schema independent, the exemplary thesaurus 110 may be used with any number of specially created and maintained databases (e.g., database 112) of particular merchandise or service structured data, or in the general case, discrete and heterogeneous data sources. For example, the thesaurus 110 may be used to amalgamate three heterogeneous data sources, one from a printer manufacturer, one from a copier distributor, and one from a scanner reseller. Thus, the thesaurus 110 may increase efficiency in the printing industry by providing a single interface to data sources that were once discrete and isolated.

The thesaurus 110 in FIG. 2 is also an illustrative fragment of a complete thesaurus 110 of FIG. 1. In accordance with certain embodiments of the invention, thesaurus 110 may also include any number of key-objects and synonyms as desired. As can be appreciated, Printer_B, Printer_C, Scanner_B, Scanner_C, Copier_B, Copier_C, Fax_machine_B, Fax_machine_C, Multifunction_peripheral_B, and Multifunction_peripheral_B represent different classes of printers, scanners, copiers, fax machines, and multifunctional peripherals, respectively. These different classes may be used to integrate heterogeneous objects that logically represent similar objects. For example, Printer_B and Printer_C both represent printers, but Printer_B is a monochrome printer, whereas Printer_C is a color printer, as evidenced by the Max_print_speed_color_ppm field in the Printer_C key-object. Thus, the organization of the thesaurus 110 itself may facilitate the querying of specially created and maintained databases 112 of particular merchandise or service structured data, or in the general case across multiple heterogeneous data sources, by providing independent classes of key-objects. In addition, although the exemplary thesaurus 110 is used with printing related objects, any type of data object may be used as desired.

FIG. 3 illustrates an exemplary table of meta-objects that may be included into key-objects in accordance with one embodiment of the invention. As shown in FIG. 3, the atomic meta-object Advertising_movie_avi has type of file_avi, does not allow standard values specified, and may be implicitly included into other objects. The atomic meta-object Advertising_string has type set to string, does not allow standard values specified, and may be implicitly included into other objects. The atomic meta-object Object_semantics has type set to string, allows object-specific standard values and their alteration in responses to queries, and does not allow implicit inclusion into other objects. The atomic meta-object Object_version has type of string, allows object-specific standard values, but does not allow their alteration, and allows implicit inclusion into other objects. Although there are four meta-objects shown in FIG. 3, any number and type of meta-objects may be used, as desired.

FIG. 4 illustrates exemplary key-objects after inclusion of the standard meta-objects of FIG. 3 in accordance with one embodiment of the invention. As shown in FIG. 4, three different object-specific instances of the Object_semantics meta-object are included into three of the key-objects. The value of the Object_semantics meta-object in the Multifunction_peripheral_B key-object is "Multifunction Monochrome Peripheral"; the value of the Object_semantics meta-object in the Printer_B key-object is "Monochrome Printer"; and the value of the Object_semantics meta-object in the Printer_C key-object is "Color Printer." As can be appreciated, the meta-objects describe semantics of key-objects for query formulation. The meta-objects facilitate or augment the querying of key-objects using standard meta-object instances, which may be more informative than the presumably short names of the key-objects alone. For example, the meta-objects described above reveal the type of printer with more detail than the key-object name alone. Thus, the inclusion of meta-objects produces more user-friendly and useful results than standard querying techniques. In addition, the meta-objects may add functionality to a system employing at least one embodiment of the invention. For example, the meta-object Advertising_movie_avi facilitates or augments the inclusion of advertisements and promotional materials with a user query. Presenting advertisements to the user, in addition to the results of the user query, increases the functionality of the system by permitting advertisers to associate advertising material with the queries.

FIG. 5 illustrates a graphical user interface 104 in accordance with one embodiment of the invention. For exemplary purposes, the interface 104 uses a representation of the Printer_B key-object of FIG. 4. On the top of the interface 104, the Printer_B key-object and the Object_semantics and Object_Version meta-objects are shown. The Object_semantics meta-object has a value of "Monochrome Printer", and the Object_Version meta-object has a value of "007-200070707". A user may utilize the various input fields on the interface 104 to formulate a query. Particularly, FIG. 5 illustrates an example where a user wishes to find all laser printers containing the string of symbols 'le' in the manufacturer field, having no duplex mode, allowing a printing speed in black of not less than 14 ppm, and allowing a printing resolution of not less than 600×600 dpi. The bottom of the interface 104 includes two user preferences. The first user preference determines if a query enhancement should be performed, and when answered positively, the query enhancement will allow matching responses to come not only in the form of the Printer_B key-object instances, but also in the form of instances of other key-objects that satisfy the search criteria. The second user preference determines what type of advertisement should be included in the response. The two available options are an advertising string or an advertising movie, which are derived from the meta-objects Advertising_string and Advertising_movie_avi of FIG. 3. Although two user preferences are shown in FIG. 5, any number of user preferences may be included as desired. In addition, the interface 104 depicted in FIG. 5 is exemplary of an interface 104 used to query a key-object. The interface 104 may be constructed using one or more key-objects contained in the thesaurus 104, as desired.

As can be appreciated, the layout and type of interface 104 may be changed as desired by adding and removing various types of user inputs, such as checkboxes, radio buttons, drop-down boxes, and text entry fields. Moreover, in at least some embodiments, the interface 104 may utilize more than one object. For example, the interface 104 may dynamically create the appropriate user inputs for multiple key-objects through programming logic and return results from these key-objects as specified by the user search criteria. Such embodiments enable users to quickly find more than one object (e.g., a color printer and a scanner) through the same interface 104. In addition, although a graphical user interface 104 is used in FIG. 5, any type of user interface 104 may be employed, such as a command line interface, a virtual interface, an auditory interface, and/or a haptic interface.

FIG. 6 shows the query of FIG. 5 reformulated using exemplary structured query language in accordance with at least one embodiment of the invention. Similarly to queries formulated using a relational structured query language, such as SQL, the query in FIG. 6 includes four clauses: SELECT, FROM, WHERE, and EXPAND. The exemplary semantics differ from the standard SQL semantics to accommodate the potentially complex structure of the key-objects. This is in direct contrast to the "flatness" of the relational tables served by the standard SQL. Another principle difference manifests in the source-independent nature of the query in FIG. 6, whereas standard SQL queries always relate to specific databases, specific tables or views of the databases, and specific attributes of the tables or views. In particular, the SELECT clause of the query in FIG. 6 relates to the key-objects rather than the attributes of relational tables. Thus, the SELECT clause means "all instances of key-object Printer B as defined by thesaurus 110 of the FROM clause that satisfy the WHERE clause," versus the standard SQL meaning of "list of columns of a table specified by the FROM clause from the rows that satisfy the WHERE clause." The EXPAND clause is optional and reflects the user preference of query enhancement in FIG. 5.

The WHERE clause of the query in FIG. 6 is a compound predicate formed using several elements. First, a function AnyCase( ) specifies that the string constant 'le' inputted by the user in the interface 104 of FIG. 5, as well as the string constant 'laser', must be considered independently of the case of the letters (i.e., upper- or lowercase). This function, surrounded by asterisks on both sides, forms a pattern expression indicating that the 'le' constant may reside in any place of the containing string. Second, a predicate "equals to 'laser' in any case letters" is performed on the Printing_method target atomic key-object instances. Third, a predicate Contains( ) specifies that the string values of the Manufacturer target atomic key-object instances must include string 'le' in any case. Fourth, a predicate "greater or equals 600" is performed on the numeric values of the target atomic key-object instances Max_print_resolution_horisontal_dpi and Max_print_resolution_vertical_dpi. Fifth, a predicate "equals 0" is performed on the boolean values of the target atomic key-object Duplex_printing. Finally, a predicate "greater or equals 14" is performed on the numeric values of the Max_print_speed_black_ppm target atomic key-object instances. This compound predicate is the translation of the user query in FIG. 5 to an exemplary structured query language.

FIG. 7 illustrates four subqueries generated in response to the user input of FIG. 5 in accordance with one embodiment of the invention. These subqueries are alphabetically ordered and formulated using an exemplary query language and illustrate the query enhancement feature specified by the user in FIG. 5. The set of subqueries is derived from the reformulated query of FIG. 6 using the thesaurus 110 of FIG. 1 or FIG. 2. Query #3 is directed to the Printer_B key-object because Printer_B was the key-object used to generate the interface 104 of FIG. 5. This query is produced regardless of whether query enhancement was chosen by the user.

Query #4 is directed to the Printer_C key-object because Printer_C includes all key-objects in the WHERE clause of FIG. 6, except Manufacturer. However, the Printer_C key-object does contain the Brand synonym for Manufacturer, as defined by the thesaurus 110 of FIG. 1 or FIG. 2. Thus, a subquery for the Printer_C key-object must be generated. The WHERE clause of Query #4 is identical to the WHERE clause of Query #3 except that Manufacturer is replaced by Brand, again in accordance with the thesaurus 110 of FIG. 1 or FIG. 2.

Query #2 is directed to the Multifunction_peripheral_C key-object because Multifunction_peripheral_C includes the Printer_C key-object as defined by the thesaurus 110 of FIG. 1 or FIG. 2. The WHERE clauses of Queries #2 and #4 differ because besides the Brand key-object contained by Printer_C, Multifunction_peripheral_C contains its own Brand key-object as defined by the thesaurus 110 of FIG. 1 or FIG. 2. Therefore, the predicate Contains( ) must be duplicated to accommodate the second Brand key-object. In order to distinguish between the two instances of the Brand key-object, Query #2 qualifies each of the two Brand occurrences with the name of the parent key-object, and the "OR" logical operator is used to combine the two Contains( ) predicates. Since the name of the Multifunction_peripheral_C key-object is relatively long, an alias "a" is defined within the SELECT clause which is then used in the WHERE clause to reference this object.

Finally, Query #1 is directed to the Multifunction_peripheral_B key-object because Multifunction_peripheral_B includes the Printer_B key-object as defined by the thesaurus 110 of FIG. 1 or FIG. 2. Query #1 is built analogously to Query #2 with the only variation being that Printer_B contains the Manufacturer key-object and Multifunction_peripheral_B contains its synonym, Brand. Therefore, a Contains( ) predicate is added for the Brand key-object in addition to the Contains( ) predicate for the Manufacturer key-object, as done in Query #3. Since no more semantically distinct queries can be derived using the query of FIG. 6 and the thesaurus 110 of FIG. 1 or FIG. 2, the subquery generation process is complete.

Figure 10:
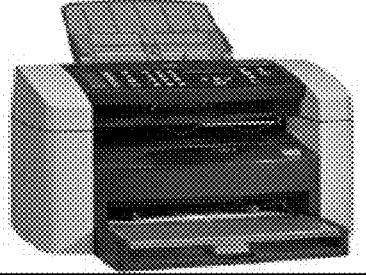
FIG. 10 shows an exemplary instance of a key-object produced in response to the query in FIG. 5 in accordance with one embodiment of the invention.

FIGS. 8, 9, and 10 depict exemplary responses to the user query of FIG. 5 in accordance with one embodiment of the invention. In particular, FIG. 8 represents an exemplary instance of the Printer_B key-object produced as a response to Query #3 of FIG. 7. Notice that it includes an instance of the Advertising_string metaobject ("BEST VALUE!"), as indicated by the user in FIG. 5. The darkened elements in FIG. 8 illustrate the values conforming to the WHERE clause of Query #3 of FIG. 7. The name of the Picture atomic key-object is not shown. The meta-object Object_version is also not shown.

FIG. 9 depicts an exemplary instance of the Printer_C key-object produced as a response to Query #4 of FIG. 7. Notice that the key-object includes an instance of the Advertising_string metaobject ("WHY BUY BLACK AND WHITE!"), as indicated by the user in FIG. 5. The darkened elements in FIG. 9 illustrate the values conforming to the WHERE clause of Query #4 of FIG. 7. The name of the Picture atomic key-object is not shown. The meta-object Object_version is also not shown.

FIG. 10 shows an exemplary instance of Multifunction_peripheral_B produced as a response to Query #1 of FIG. 7. Notice that the key-object includes an instance of the Advertising_string metaobject ("FOUR IN ONE! A STEAL!"), as indicated by the user in FIG. 5. The darkened elements in FIG. 10 illustrate the values conforming to the WHERE clause of Query #1 of FIG. 7. The name of the Picture atomic key-object is not shown. Meta-object Object_version is not shown. The instances of Copier_B, Fax_machine_B, and Scanner_B key-objects are also not shown.

Figure 11:
FIG. 11 shows an exemplary webpage of a key-object produced in response to the query in FIG. 5 in accordance with one embodiment of the invention.

FIG. 11 shows an exemplary webpage displaying a model of a monochrome laser printer, which presents a key-object instance for Printer_B satisfying the WHERE clause from the query of FIG. 6. The monochrome laser printer or key-object instance Printer B is the same model as shown in FIG. 8. In addition, the HTML source for the FIG. 11 webpage is shown in FIG. 12.

FIG. 12 shows the HTML source of an exemplary webpage from FIG. 11. The source contains an exemplary meta-tag "keyobjects" with a link to an exemplary JavaScript Object Notation (JSON) file "filename.json" containing the instance of the key-object Printer_B. Generally, multiple meta-tags "keyobjects" may be included in the webpage, each pointing to a file containing single or multiple instances of one or more key-objects. Alternatively a meta-tag can point to a linked file containing multiple instances of multiple key-objects.

FIG. 13 shows the content of file "filename.json" linked to the webpage of FIG. 12. It contains an instance of key-object Printer_B like the one of FIG. 8.

A generalized embodiment of a system and/or a method that may be implemented via a structured search to eliminate voluminous and wasteful search outputs derived from keyword-type searches is based on a collection, catalog, or thesaurus 110 of structured query objects called key-objects—i.e., their function resembles the function of keywords in an unstructured search—with relationships between some key-objects. The following steps may be implemented to complete one embodiment of a generalized method for structured searches: linking or embedding key-object instances into webpages 114 or 116 describing particular goods, services, or other entities to be searched for in a structured manner; identifying, collecting, and storing the respective key-object instances along with other information about webpages collected by search engine(s) 108 in the database(s) 112; using key-objects from a thesaurus 110 and a user interface 104 to pose structured queries via specifying the constraints on some of the elements of the key-objects; optionally expanding the query into multiple queries or subqueries using the relations between the key-objects from the thesaurus 110 to engage other key-objects not explicitly specified by the query originator, in order to make the search more comprehensive; processing the structured queries or subqueries by searching through the stored key-object instances collected by the search engines, and identifying the instances of the key-objects satisfying the search criteria; and generating a shortlist of the structured descriptions, along with links to the respective web-pages, that correspond to the key-object instances satisfying the search criteria in the search results.

In certain embodiments, there are inherently three independent and asynchronous processes described herein. First, is a process for linking or embedding key-object instances into webpages performed by webmasters, webpage designers, or the originator(s) of webpages using the World Wide Web or the Intranets. Second, is a process for extracting key-object instances from the webpages and storing the key-object instances in databases 112. Similarly, new key-objects may be added to the thesaurus 110. Third, is a process for searching using a GUI 104 as in FIG. 1. In one embodiment, GUI 104 is an aspect of a client computer 100 configured to interact with a server 120 hosting the search engine 108 that is equipped with a thesaurus of key-objects 110 and a database of key-object instances 112.

Figure 14:
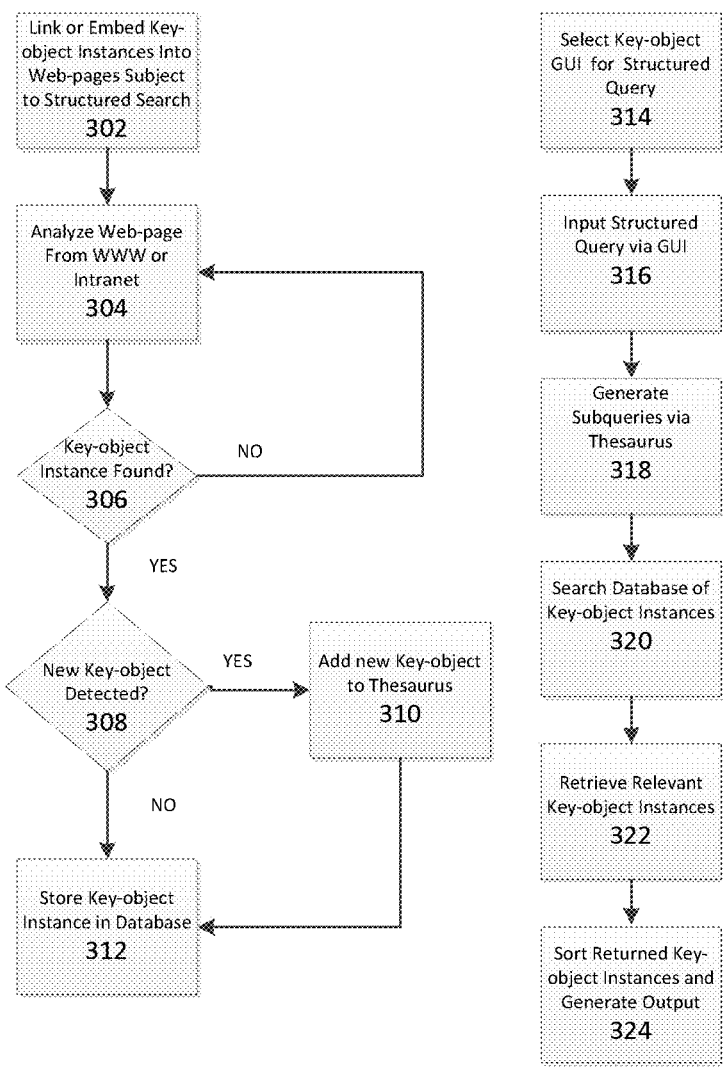
FIG. 14 shows one embodiment of the general operational steps for performing one embodiment of a structured search.

FIG. 14 shows another embodiment of a method or operational steps 300 that may be implemented to eliminate voluminous and wasteful search outputs derived from keyword-type searches. As such, a webpage creator links or embeds one or more key-object instances into a webpage (302). This linking or embedding allows each of the linked or embedded key-object instances to be searchable using a structured search (320). The key objects for the key-object instances may already reside in the thesaurus 110, or may be characterized as new key-objects. Search engine 108 analyzes webpages from the World Wide Web (e.g., webpages A-Z 114 in FIG. 1) or webpages from the Intranets (e.g., webpages A-Z 116 in FIG. 1) for the presence of one or more key-object instances (304). If one or more key-object instances are found (306), then the key-object instances are stored in database 112 (312). If one or more key-objects corresponding to the key-object instances are detected to be new (308), then the new key-objects are added to thesaurus 110 (310) for enabling future structured searches.

In one embodiment to perform or execute a structured search, a user selects a key-object GUI 104 for a structured query (314). Then, the user formulates or inputs a structured query for a structured search (316), or in another embodiment provides data input into GUI 104 (316) (e.g., via 100 in FIG. 1). Alternatively, in yet another embodiment, the user provides data input by populating various input fields on the GUI 104 to formulate a desired structured query (316) (e.g., via 100 in FIG. 1). User data input may be text, character strings, numeric figures, check boxes, radio buttons, or drop-down menus. Optionally, the input structured query may then be enhanced or reformulated into a modified subquery or subqueries using exemplary structured query language (e.g., as in FIG. 5) via thesaurus 110 (318). Particularly, subqueries may be derived from the modified query (e.g., as in FIG. 7) using thesaurus 110 (318). The graphical user interface 104 may adaptively react to user input and present data input fields in response to the user input. Related and commonly associated (i.e., semantically, synonymously, and/or antonomously) data input fields provide the user with enhanced query formulation. In the exemplary representation of the Printer_B key-object of FIG. 4, the graphical user interface 104 of FIG. 5 may present the data input field checkboxes for Printing Method as "Laser," "Inkjet," "Digital Photo," or "Multifunction," etc. in response to the user data input "Manufacturer." However, only related and commonly associated data input fields may be provided such that only certain printing methods are targeted for example.

A processor, computer, computer system, device, or server (e.g., CPU 106 of 120 in FIG. 1, or a plurality of 120, without limitation) then executes or performs a search of at least one database of key-object instances (e.g., Database 112 of FIG. 1, or a plurality of 112, without limitation) representing particular merchandise or service-structured data (320) for the key-object instances that satisfy the user formulated structured query, or optionally the subqueries derived from input structured query (supra). Execution of the search allows for retrieval of relevant key-object instances, and/or links to the hosting webpages analogous to depictions in FIG. 13 (322). Some embodiments of the data structures may include consumer product specifications and technical data, professional services and pricing models, media providers and types of content, or geographical locations with available infrastructures for specific types of commercial activity. One embodiment of such data structures may be a list of all types of digital cameras manufactured by commercial vendors and their associated product specifications and technical data. In yet another embodiment, such data structures may be a list of all types of information technology data storage consulting companies and their associated pricing models. Following completion of (320) and/or (322), CPU 102 or 106 sorts the returned key-object instances and generates a shortlist in the form of an output (324). The generation of a shortlist allows increasingly relevant or specific, precise, expedient, and succinctly comparable structured search outputs, as shown in FIGS. 8-10.

In one embodiment, a process for extracting key-objects from the hosting webpages is described as follows. Using CPU 106 (cf. FIG. 1) the search engine 108 collects and analyzes or compares found key-object instances to a plurality of stored key-objects in thesaurus 110 (304) and key-object instances in database 112. More specifically, using CPU 106 (cf. FIG. 1) the search engine determines whether or not a key-object instance is found in a webpage (306). If an instance of a new key-object is detected (308), then CPU 106 stores the newly detected key-object into thesaurus 110 (310) and the instance of the new key-object with a link to the hosting webpage into database 112 (312). If new key-object is not detected, that is this is an instance of a key-object already present in the thesaurus 110, CPU 106 stores the found key-object instance in database 112 (312).

The plurality of target key-object instances represents a shortlist of identities of goods or services. In one embodiment, the shortlist represents specific objects sought after by the user query. In yet another embodiment, the shortlist may include a list of desired consumer products, professional services, media content providers, or geographical locations. For example, the short list may include desired digital cameras sought after by the user's formulated query.

A key-object may also be a representation of a query to a data source that is independent of the schema of the data source. Heterogeneous data sources may be horizontally integrated across interrelated entities. For example, the heterogeneous data sources may be commercial entities, such as Amazon.com, Bestbuy.com, eBay.com, or shopping.Yahoo.com, etc., government entities, such as Science.gov, Darpa.mil, Nasa.gov, Nist.gov, or Nsf.gov, etc., or networked data storage file servers including application data, documents, emails, photographic media, audio media, or video media, etc. Heterogeneous data sources may also be vertically integrated entities, such as commercial retailers, manufacturers, OEM suppliers, service and support providers, and value-added re-sellers in a specified industry or market segment.

Searching and executing structured queries against specially created and maintained databases 112 or across heterogeneous data sources may be facilitated via accessing ordinary public domains, interfaces, channels, ports, or network sockets. The structured search may also be carried out via accessing a dedicated IP-address, provisioned network socket, back-door interfaces, secure authenticated HTTP sessions, or other non-public pathway to the data source. Agreements may be made with data source owners in order to more efficiently access, connect and search such data sources via the system and method described herein.

Information or characteristic information about target key-objects obtained by the computer or processor 102 will depend on inherent features, elements, traits, or properties of the specific objects sought by the user's structured query. For example, such characteristic information may be pricing and how to buy a desired object, however, the embodiments of the information or characteristic information will ultimately depend on the initial user structured query, and such embodiments are not limited to any specific qualitative or quantitative designations.

Information resulting from executing structured queries against specially created and maintained databases 112, or the search across heterogeneous data sources, is presented to the user via the graphical user interface 104 in a format that allows comparison. Depending on the type of structured query, there may be optimal means for presenting characteristic information in order to aid user comparison of specific objects sought after by the user's structured query. In one embodiment, a shortlist of desired consumer products generated may be listed in columns with a row for each product beginning with an identification or name of the product, an image of the product, price, source where available, shipping charge, and warranty, etc. In another embodiment, professional services and pricing models may be presented in a tiered graphical representation, ranking the quality of the associated providers. In another embodiment, a shortlist of desired media providers may be presented in a grid with snapshots of the provider's website, and symbols representing types of available content. In yet another embodiment, a shortlist of geographical locations with available infrastructures for specific types of commercial activity may be presented with a two-dimensional (2D) or three-dimensional (3D) interactive map of the locations and associated infrastructures. Furthermore, information may be presented to the user in real-time.

Agreements may be made with designated commercial entities for pushing or forwarding internet traffic to associated websites from a host site for the graphical user interface 104 of the presently described system and method. Advertisements may also be accurately targeted in the graphical user interface 104 in response to the shortlist of specific objects sought after by the user's structured query. Advertisements may be targeted to the market demographic of buyers and users of professional digital cameras in accordance with at least one of the embodiments described above. Types of advertisements utilized in the system may be traditional banner advertisements, media-rich banner ads, pop-up ads, floating ads, or cursor ads.

In at least one embodiment, the structured search of information includes a search for goods and services in e-commerce. The structured search allows for a particular product based upon technical features and specifications. A user formulates the structured query using the graphical user interface 104 by entering desired technical features and specifications. For example, in formulating a structured search for a laptop computer, the user enters the type of operating system, screen size, CD, DVD or Blu-ray, memory size, hard drive size, video card specifications, sound card specifications, wireless options such as IEE 802.11, or Bluetooth, battery options, and warranty or support coverage. The user does not have to know the model name, brand name, or manufacturer name that would be needed for an ordinary keyword or unstructured search. The graphical user interface 104 adaptively reacts to user input and presents data input fields in response to user input. As the user inputs data related to a laptop computer's specifications, the graphical user interface 104 generates commonly associated data fields in order to further guide the user in formulating a structured query. For example, as the user populates the data input field "operating system" with the entry "OS X v10.5.4 Leopard," the interface 104 immediately generates radio buttons with the choices, "MacBook," "MacBook Pro," or "MacBook Air," as the given laptop computers available with the specified operating system.

In another embodiment of the structured search, the user searches for a particular professional service or information service based upon qualitative and quantitative characteristics. For example, in formulating a structured search for a financial services firm, the user enters asset management, hedge fund management, and stockbrokers, with conservative asset allocation, and high diversification. As the user populates the data field "conservative asset allocation," the graphical user interface 104 immediately generates data fields with the choices "stocks," "bonds," "real-estate," and "commodities." The user is then able to input which types of assets the financial services firm is to cover.

Upon successful entry of a number of technical features and specifications, the user formulates a structured query with the graphical user interface 104. Thereafter, the structured query is processed and executed against a specially created and maintained database 112, or in a general case, against multiple heterogeneous data sources. The specially created and maintained database 112 is built and maintained by pulling all instances of a particular good or service in e-commerce from information available on the Internet and World Wide Web. Additionally, agreements may be made with third-party information providers or commercial entities in order to access particular databases of structured data for querying. For example, an agreement may be made with Amazon.com in order to download to a specially maintained database 112, all the instances of laptop computers available for sale and their particular sets of specifications and technical features.

Upon successful execution of the structured query and structured search, the shortlist of goods and services is generated. The shortlist is presented via the graphical user interface 104 in a format that allows comparison of identities of the goods and services queried for. In accordance with the example above related to searching for a laptop computer, the shortlist generated may contain a group of laptop computers that has the desired technical features and specifications. Also, in accordance with the example above related to searching for a financial services firm, the shortlist generated may contain a group of firms which provide the desired qualitative and quantitative characteristics. In all instances, in generating the shortlist, links are provided to the merchant or service provider's webpage. With the shortlist presented via the graphical user interface 104, the user may locate the best deal for a particular goods or services through comparison. Thereafter, the user may complete a purchase of the particular goods or services in e-commerce.

In at least one embodiment, the method and system for structured search of information includes a search for goods and services in mobile e-commerce. Typically, a structured search in mobile e-commerce is carried out via a handheld mobile telecommunications device, such as a cell phone (e.g., 100, a Blackberry, or iPhone, etc.). In the scenario of mobile e-commerce, the structured search is particularly useful. Remember, an ordinary keyword or unstructured search will generate an overwhelmingly voluminous list of responses. Additionally, broadband connection speeds are slower with mobile telecommunications devices, thus further slowing the process by clogging data packets for transmission with superfluous, unneeded information. Also, a keyword or unstructured search user never actually views all responses generated by the unstructured search. This problem is further compounded by the nature of mobile devices and the corresponding user experience. Usually, a mobile device user has less time to sift through information due to the "on-the-go" nature of mobile users who generally need faster access to information. Also, mobile device screen sizes are smaller and may not be able to display the voluminous responses generated by an ordinary keyword or unstructured search.

The formulation of a structured query using a graphical user interface 104 on a mobile telecommunications device is accomplished by taking the user across multiple, page-by-page presentations of data input fields. For example, in a structured search for a "hotel," the mobile device user is presented with a data field for entering the "location," then presented with a data field for entering "number of occupants," then "duration of stay," and then "choice of amenities," such as the existence and size of a swimming pool, or WiFi Internet, etc. The graphical user interface 104 of the mobile telecommunications device adaptively reacts to user input and presents data input fields and pages in response to user input. For example, in entering the data field of "location" with the entry "Las Vegas," the user is presented with the data fields, "deluxe room," "premium room," "industry suite," "fantasy suite," or "penthouse," etc. The user is then able to select which type of room and the desired amenities the structured query is to cover.

Upon formulation of the structured query, the structured query is then executed against a specially created and maintained database 112, or in a general case, against multiple heterogeneous data sources. Databases (e.g., a plurality of 112) may be specially built and maintained in order to better service mobile e-commerce users. The specially created databases 112 are composed of structured data pulled from various Internet and World Wide Web sources and also supplied by third-party data providers.

For example, mobile users may be statistically likely to search for hotel accommodations when searching from a certain airport location, and develop a clear trend for completing purchases for accommodations at a small group of hotels. The central database 112 will record this structured data and incorporate the structured data into the execution of future formulated queries of mobile users at that airport. In another scenario, mobile users may be likely to search for food and drink locations during after-hours or on the weekends. The central database 112 will update structured data for statistical patterns of mobile user queries in real-time and better provide up-to-date information to the mobile user.

In such an embodiment, mobile users across a telecommunications network (e.g., 200) may formulate queries for food and drink locations with Mediterranean cuisine, wine list, wait times of less than twenty minutes, and locations within five miles, etc. The specially created database 112 will be maintained in order to keep real-time data regarding the wait times and status of food and drink locations satisfying the mobile user's formulated query. The execution of the mobile user's formulated query against the special database 112 will generate a shortlist of food and drink locations relevant to the user's particular qualitative and quantitative characteristics updated in real-time.

The graphical user interface 104 of the mobile device will present the shortlist in a manner or format that allows for comparison of the identities of food and drink locations. For example, food and drink locations may be simply listed according to price, rating, or distance. Particularly useful in mobile e-commerce, the mobile device graphical user interface 104 will allow the user to directly communicate with the food and drink location or visit their website. In presenting the shortlist of structured search results, the mobile user is able to look for the best deal or most desired accommodation in real-time.

Since the results of the structured search are precise, the full results of the search can be communicated via e-mail or text messages, for example. Therefore, the structured queries can be stored and executed on-demand or on-schedule with the search results periodically communicated to the users who are looking to take advantage of a good deal. The full results of the structured search can be presented on handheld mobile devices, TV sets, etc. This service is not practical with unstructured keyword searches because of the intrinsic imprecision resulting from voluminous outputs.

Although the principles related to the structured search invention herein have been illustrated in embodiments associated with e-commerce and mobile e-commerce, it is intended that the principles of this invention may also be applied to other applications, such as medical and healthcare information technology, social networking, market research, or bioinformatics.

Thus, the foregoing described embodiments of the invention are merely provided as an illustration and/or a description. Disclosed embodiments are not intended to limit the invention to the precise form(s) described herein. Other variations and embodiments are possible in light of the above teaching, and it is thus intended that the scope of the invention not be limited by the detailed description, but rather by the claims that follow.

What is claimed is:

1. A method performed by one or more computers, the method comprising:

collecting a plurality of key object instances linked or embedded in respective documents of a plurality of websites, wherein each key object instance is an instance of a key object, wherein each key object has a key object name that identifies a key object structure, and wherein a key object structure is defined by a set of named data structures belonging to the key object structure;

maintaining a collection of the collected key object instances, wherein each key object instance is associated in the collection of key object instances with the respective document from which it was collected;

receiving a structured search query expressed in a structured query language, wherein the structured search query specifies a particular key object name and one or more predicates specifying the conditions under which key object instances in the collection of key object instances satisfy the structured search query;

searching the collection of key object instances for i) key object instances matching the particular key object name and ii) key object instances matching one or more other key object names that are associated with the particular key object name in a key object thesaurus;

obtaining key object instances that satisfy the one or more predicates and that match the particular key object name or any of the one or more other key object names that are associated with the particular key object name in the key object thesaurus; and returning the obtained key object instances and the associated documents of the obtained key object instances in response to receiving the structured search query.

2. The method of claim 1, wherein searching the collection of key object instances comprises searching without using a search engine index.

3. The method of claim 1, wherein collecting key object instances from web pages comprises:

identifying a new key object instance linked or embedded in a respective document of a web site;

adding the new key object instance to the collection of key object instances and associating the new key object in the collection of key object instances with the respective document from which it was collected;

determining if the new key object instance is an instance of a new key object that is not in the key object thesaurus; and if the new key object is not in the key object thesaurus, adding the new key object name to the key object thesaurus and associating the new key object name with other key object names in the key object thesaurus.

4. The method of claim 1, wherein the collection of key object instances comprises key object instances that represent entities described on web pages.

5. The method of claim 1, further comprising:

generating one or more alternative structured search queries, wherein each alternative structured search query specifies i) a respective alternative key object name identified as a parent of the particular key object name in the key object thesaurus and ii) the one or more predicated specified by the structured search query;

searching the collection of key object instances for i) key object instances matching the alternative key object names and ii) key object instances matching one or more other key object names that are associated with the alternative key object names in the key object thesaurus;

obtaining alternative key object instances satisfying the one or more predicates and that match the alternative key object names or any of the one or more other key object names that are associated with the alternative key object names in the key object thesaurus; and returning the obtained alternative key object instances and the associated documents of the obtained alternative key object instances in response to receiving the structured search query.

6. The method of claim 1, wherein the particular key object name identifies a particular key object structure that is different from other key object structures identified by the one or more other key object names that are associated with the particular key object name in a key object thesaurus.

7. The method of claim 6, wherein the structured search query specifies the particular key object name but does not specify any of the one or more other key object names that are associated with the particular key object name in the key object thesaurus.

8. A system comprising:

one or more computers and one or more storage devices storing instructions that are operable, when executed by the one or more computers, to cause the one or more computers to perform operations comprising:

collecting a plurality of key object instances linked or embedded in respective documents of a plurality of websites, wherein each key object instance is an instance of a key object, wherein each key object has a key object name that identifies a key object structure, and wherein a key object structure is defined by a set of named data structures belonging to the key object structure;

maintaining a collection of the collected key object instances, wherein each key object instance is associated in the collection of key object instances with the respective document from which it was collected;

receiving a structured search query expressed in a structured query language, wherein the structured search query specifies a particular key object name and one or more predicates specifying the conditions under which key object instances in the collection of key object instances satisfy the structured search query;

searching the collection of key object instances for i) key object instances matching the particular key object name and ii) key object instances matching one or more other key object names that are associated with the particular key object name in a key object thesaurus;

obtaining key object instances that satisfy the one or more predicates and that match the particular key object name or any of the one or more other key object names that are associated with the particular key object name in the key object thesaurus; and returning the obtained key object instances and the associated documents of the obtained key object instances in response to receiving the structured search query.

9. The system of claim 8, wherein searching the collection of key object instances comprises searching without using a search engine index.

10. The system of claim 8, wherein collecting key object instances from web pages comprises:

identifying a new key object instance linked or embedded in a respective document of a web site;

adding the new key object instance to the collection of key object instances and associating the new key object in the collection of key object instances with the respective document from which it was collected;

determining if the new key object instance is an instance of a new key object that is not in the key object thesaurus; and if the new key object is not in the key object thesaurus, adding the new key object name to the key object thesaurus and associating the new key object name with other key object names in the key object thesaurus.

11. The system of claim 8, wherein the collection of key object instances comprises key object instances that represent entities described on web pages.

12. The system of claim 8, wherein the operations further comprise:

generating one or more alternative structured search queries, wherein each alternative structured search query specifies i) a respective alternative key object name identified as a parent of the particular key object name in the key object thesaurus and ii) the one or more predicated specified by the structured search query;

searching the collection of key object instances for i) key object instances matching the alternative key object names and ii) key object instances matching one or more other key object names that are associated with the alternative key object names in the key object thesaurus;

obtaining alternative key object instances satisfying the one or more predicates and that match the alternative key object names or any of the one or more other key object names that are associated with the alternative key object names in the key object thesaurus; and returning the obtained alternative key object instances and the associated documents of the obtained alternative key object instances in response to receiving the structured search query.

13. The system of claim 8, wherein the particular key object name identifies a particular key object structure that is different from other key object structures identified by the one or more other key object names that are associated with the particular key object name in a key object thesaurus.

14. The system of claim 13, wherein the structured search query specifies the particular key object name but does not specify any of the one or more other key object names that are associated with the particular key object name in the key object thesaurus.

15. One or more non-transitory computer storage media encoded with computer program instructions that when executed by one or more computers cause the one or more computers to perform operations comprising:

collecting a plurality of key object instances linked or embedded in respective documents of a plurality of websites, wherein each key object instance is an instance of a key object, wherein each key object has a key object name that identifies a key object structure, and wherein a key object structure is defined by a set of named data structures belonging to the key object structure;

maintaining a collection of the collected key object instances, wherein each key object instance is associated in the collection of key object instances with the respective document from which it was collected;

receiving a structured search query expressed in a structured query language, wherein the structured search query specifies a particular key object name and one or more predicates specifying the conditions under which key object instances in the collection of key object instances satisfy the structured search query;

searching the collection of key object instances for i) key object instances matching the particular key object name and ii) key object instances matching one or more other key object names that are associated with the particular key object name in a key object thesaurus;

obtaining key object instances that satisfy the one or more predicates and that match the particular key object name or any of the one or more other key object names that are associated with the particular key object name in the key object thesaurus; and returning the obtained key object instances and the associated documents of the obtained key object instances in response to receiving the structured search query.

16. The one or more non-transitory computer storage media of claim 15, wherein searching the collection of key object instances comprises searching without using a search engine index.

17. The one or more non-transitory computer storage media of claim 15, wherein collecting key object instances from web pages comprises:

identifying a new key object instance linked or embedded in a respective document of a web site;

adding the new key object instance to the collection of key object instances and associating the new key object in the collection of key object instances with the respective document from which it was collected;

determining if the new key object instance is an instance of a new key object that is not in the key object thesaurus; and if the new key object is not in the key object thesaurus, adding the new key object name to the key object thesaurus and associating the new key object name with other key object names in the key object thesaurus.

18. The one or more non-transitory computer storage media of claim 15, wherein the collection of key object instances comprises key object instances that represent entities described on web pages.

19. The one or more non-transitory computer storage media of claim 15, wherein the operations further comprise:

generating one or more alternative structured search queries, wherein each alternative structured search query specifies i) a respective alternative key object name identified as a parent of the particular key object name in the key object thesaurus and ii) the one or more predicated specified by the structured search query;

searching the collection of key object instances for i) key object instances matching the alternative key object names and ii) key object instances matching one or more other key object names that are associated with the alternative key object names in the key object thesaurus;

obtaining alternative key object instances satisfying the one or more predicates and that match the alternative key object names or any of the one or more other key object names that are associated with the alternative key object names in the key object thesaurus; and returning the obtained alternative key object instances and the associated documents of the obtained alternative key object instances in response to receiving the structured search query.

20. The one or more non-transitory computer storage media of claim 15, wherein the particular key object name identifies a particular key object structure that is different from other key object structures identified by the one or more other key object names that are associated with the particular key object name in a key object thesaurus.

* * * * *